(12) United States Patent
Kumar

(10) Patent No.: US 9,591,021 B2
(45) Date of Patent: Mar. 7, 2017

(54) ZERO DAY THREAT DETECTION USING HOST APPLICATION/PROGRAM TO USER AGENT MAPPING

(71) Applicant: McAfee, Inc., Santa Clara, CA (US)

(72) Inventor: Manish Kumar, Bilekahalli (IN)

(73) Assignee: McAfee, Inc., Santa Clara, CA (US)

( * ) Notice: Subject to any disclaimer, the term of this patent is extended or adjusted under 35 U.S.C. 154(b) by 3 days.

(21) Appl. No.: 14/464,377

(22) Filed: Aug. 20, 2014

(65) Prior Publication Data

US 2016/0057158 A1   Feb. 25, 2016

(51) Int. Cl.
*H04L 29/06*   (2006.01)

(52) U.S. Cl.
CPC ...... *H04L 63/145* (2013.01); *H04L 2463/144* (2013.01); *H04L 2463/146* (2013.01)

(58) Field of Classification Search
CPC ............. H04L 63/1408; H04L 63/1433; H04L 63/1441; H04L 63/14; H04L 63/145; H04L 2463/144; H04L 2463/146
USPC .......................................................... 726/25
See application file for complete search history.

(56) References Cited

U.S. PATENT DOCUMENTS

| | | | |
|---|---|---|---|
| 8,490,173 B2 | 7/2013 | Komura et al. | |
| 2008/0126790 A1 | 5/2008 | Bantz et al. | |
| 2009/0158430 A1* | 6/2009 | Borders | G06F 21/552 726/23 |
| 2010/0067535 A1* | 3/2010 | Ma | H04L 43/028 370/401 |
| 2013/0117858 A1 | 5/2013 | Werner et al. | |
| 2013/0318604 A1* | 11/2013 | Coates | H04L 63/1416 726/22 |
| 2014/0101764 A1 | 4/2014 | Montoro | |
| 2014/0317738 A1* | 10/2014 | Be'ery | H04L 63/14 726/23 |

OTHER PUBLICATIONS

Nizar Kheir, Behavioral classification and detection of malware through http user agent anomalies, Journal of Information Security and Applications, vol. 18, Issue 1, Jul. 2013, pp. 2-13.

International Search Report and Written Opinion received in corresponding international application No. PCT/US2015/037123, mailed Oct. 5, 2015.

\* cited by examiner

*Primary Examiner* — Yogesh Paliwal
(74) *Attorney, Agent, or Firm* — Blank Rome LLP

(57) ABSTRACT

A technique allows associating host applications and user agents in network traffic and detecting possible malware without relying on signatures of the user agents. A database of host applications and user agents is maintained, allowing automatic update of the database when a new application or new application to user agent mapping is discovered. Partial matches may be made when a change is made to the application, allowing learning the new mapping automatically. If an application is associated with more than a threshold number of user agents, an indication may be generated that the application is suspicious and possibly malware.

22 Claims, 7 Drawing Sheets

ACROD32.EXE, Microsoft-CryptoAPI/6.1
FIREFOX.EXE, Mozilla/5.0 (Windows NT 6.1; WOW64; rv:24.0) Gecko/20100101 Firefox/24.0
GOOGLETALK.EXE, Google Talk
IEXPLORE.EXE, Microsoft-CryptoAPI/6.1
IEXPLORE.EXE, Mozilla/4.0 (compatible; MSIE 8.0; Windows NT 6.1; WOW64; Trident/4.0; SLCC2; .NET CLR 2.0.50727; .NET CLR 3.5.30729; .NET CLR 3.0.30729; Media Center PC 6.0; .NET4.0C; .NET4.0E)
MAINTENANCESERVICE.EXE, Microsoft-CryptoAPI/6.1
MSFEEDSSYNC.EXE, Windows-RSS-Platform/2.0 (MSIE 8.0; Windows NT 6.1)
MSIEXEC.EXE, Microsoft-CryptoAPI/6.1
MSIEXEC.EXE, Mozilla/4.0 (compatible; MSIE 6.0; Windows NT 5.1)
NITROPDFREADER.EXE, Mozilla/4.0 (compatible; MSIE 7.0; Windows NT 6.1; WOW64; Trident/4.0; SLCC2; .NET CLR 2.0.50727; .NET CLR 3.5.30729; .NET CLR 3.0.30729; Media Center PC 6.0; .NET4.0C; .NET4.0E)
PYTHONW.EXE, Python-urllib/2.7
SKYPE.EXE, Microsoft-CryptoAPI/6.1
SKYPE.EXE, Skype\x99 6.9
SVCHOST.EXE, Microsoft NCSI
SVCHOST.EXE, Microsoft-CryptoAPI/6.1
TASKHOST.EXE, MSDW
WERMGR.EXE, MSDW

ZERO DAY THREAT DETECTION USING HOST APPLICATION/PROGRAM TO USER AGENT MAPPING

TECHNICAL FIELD

Embodiments described herein generally relate to network security and in particular to a technique for detecting zero day threats.

BACKGROUND ART

Botnets and malware programs are using the Hypertext Transport Protocol (HTTP) user-agent field for communicating with a command and control server. Recently discovered advanced persistent threats have shown malware using an HTTP client to beacon out to command and control systems. Sometimes a user agent helps in identification by signature-based techniques, as in the malware IKEE.B Botnet for the Apple iPhone. This malware uses the HTTP wget command with the user agent.

Malware authors have become aware that anti-malware systems are aware of this usage of the user-agent field and have taken countermeasures. Botnets now have begun randomizing their HTTP communications to bypass user agent signature-based anti-malware defenses. They can employ a built-in mechanism that can generate random user agents while downloading secondary payloads. Thus a rethinking of the way in which anti-malware system detect command and control communication would be desirable.

In addition, even where the malware or botnet systems are not randomizing the user-agent identity information, signature-based detection can only detect known threats which have previously identified malware signatures. A way of detecting zero day (previously unknown) malware would be desirable.

BRIEF DESCRIPTION OF DRAWINGS

FIG. 1 is a table illustrating a mapping of host applications to user agents according to one embodiment.

DESCRIPTION OF EMBODIMENTS

Figure 2:
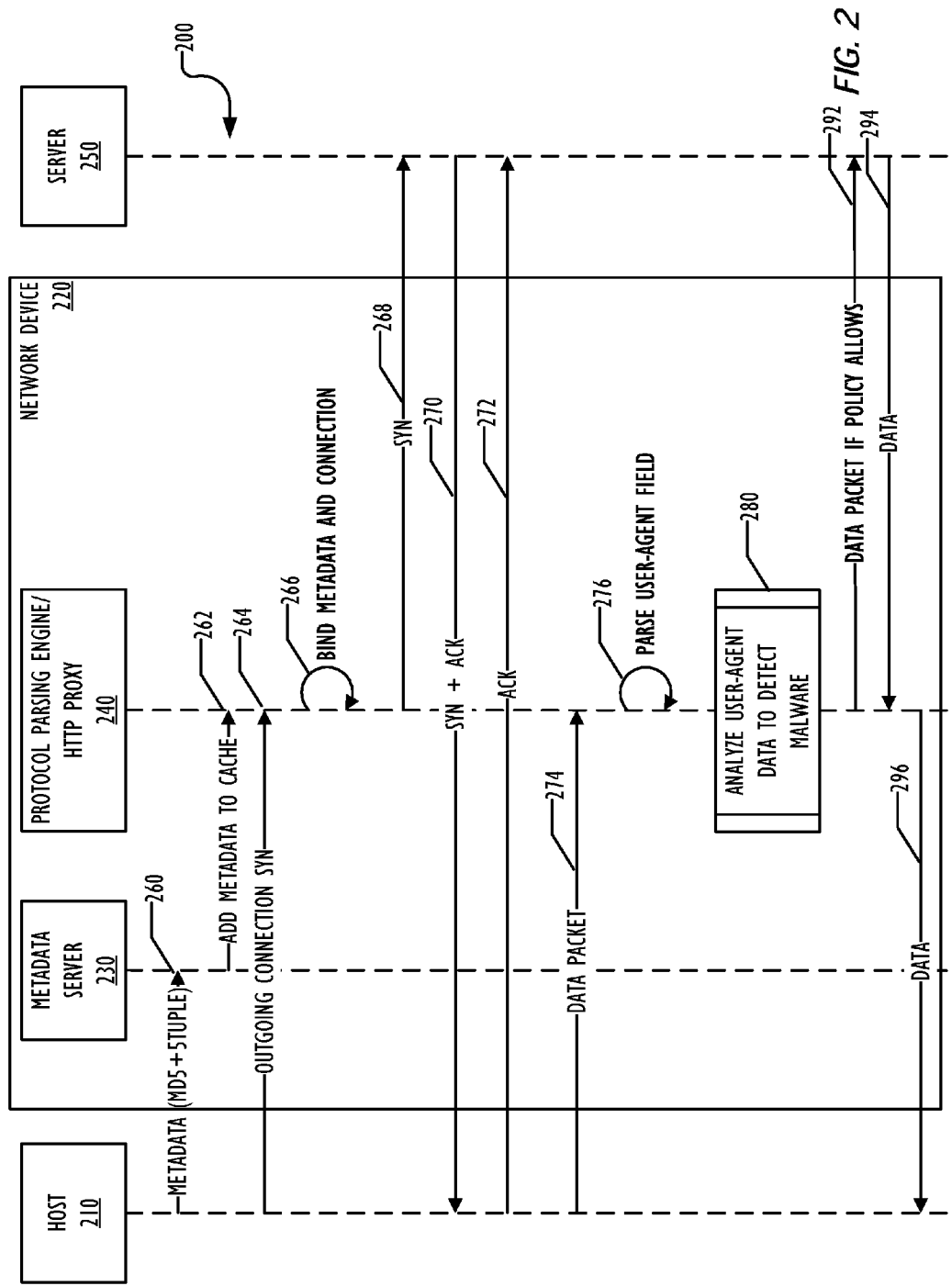
FIG. 2 is a graph illustrating a technique for detecting zero day threats using host application to user agent mapping according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "malware" refers to any software used to disrupt operation of a programmable device, gather sensitive information, or gain access to private systems or networks. Malware includes computer viruses (including worms, Trojan horses, etc.), ransomware, spyware, adware, scareware, and any other type of malicious program.

As used herein the term "application" refers to any executable software program, whether the program is a self-contained software or is a component of or contained by another program.

As used herein, the term "user agent" refers to a text string provided by an HTTP communication, typically produced by an HTTP GET that requests data from another computer system, where the HTTP GET specifies a User-Agent request-header field. The user agent string contains information about the software originating the request. The field can contain multiple product tokens and comments identifying the agent and any subproducts that form a significant part of the user agent. By convention, the product tokens are listed in order of their significance for identifying the application.

By monitoring the user-agent seen in the network with respect to the host process/application generating them, a mapping table can be built that maps host processes/application and user agents. With that mapping, several scenarios become available:

If there is an existing host process/application and user-agent mapping, and a new user-agent is detected for that host process/application, that may indicate an exploit.

When an existing host process or application software is upgraded, the upgrade may indicate a minor change in the user-agent field. We can use logic to learn the new mapping automatically.

When a new host process or application is installed in a network, we can learn the host application to user-agent mapping with help from an administrator.

Where a host process and its user-agent mapping is changing fast, this may indicate abnormal behavior. For example, a browser may provide an option to change the user-agent information manually, but that would not happen fast.

This is a signatureless approach to detect malware in the network. By creating the host process/application to user-agent mapping, any deviation in known host process-user agent mapping can be reported as anomalous, allowing a user administrator to consider the new mapping and respond to a malware attack or help the system learn a new user-agent for a new or existing host process. The following illustrates techniques to learn the host process to user-agent mapping and raise an alert for possible malicious user-agents in a network.

FIG. 1 is a table illustrating a list 100 of host applications and associated user agents according to one embodiment. Thus, for example, the ADOBE® READER® software (ADOBE, and READER are registered trademarks of Adobe Systems Incorporated) executable (ACRORD32.EXE) is associated with the user agent string "Microsoft-CryptoAPI/6.1" in this example. The same user agent string may be associated with multiple host applications. For example, the user agent string associated with Adobe Reader is also associated in this example with IEXPLORE.EXE, MAINTENANCESERVICE.EXE, MSIEXEC.EXE, SKYPE.EXE, and SVCHOST.EXE. A single host application may be associated with multiple user agent strings. For example, in the example list of FIG. 1, the application SVCHOST.EXE is associated with user agent strings "Microsoft NCSI" and "Microsoft-CryptoAPI/6.1." The application to user agent mapping illustrated in FIG. 1 is illustrative and by way of example only; other applications, user agents, and mappings may be seen by a network device employing the techniques described below, depending on the network traffic intercepted by the network device.

FIG. 2 is a graph illustrating a technique for detecting zero day threats using host application to user agent mapping according to one embodiment. In this example, a host 210 generates an HTTP request to server 250. Although referred to herein as "host" and "server," no significance should be placed on those names; each can be any type of programmable device capable of sending and receiving HTTP protocol communications.

A network device 220 according to this embodiment intercepts the HTTP protocol network traffic and performs the zero day threat detection techniques described below. Although in this example the network device is a separate device intermediate between the host 210 and the server 250, the techniques described herein can be implemented as a component or module executing on either the host 210 or the server 250 or both. Alternately the functionality described below may be implemented in multiple separate devices instead of a single network device.

At step 260, when an application running in the host 210 attempts to do an HTTP GET from server 250, anti-malware software running in the host 210 provides metadata regarding the desired connection to a metadata server 230 of the network device 220. The metadata in one embodiment includes a hash of the executable attempting to do the HTTP GET, such as an MD5 hash, as well as a 5-tuple of data corresponding to the connection: source address, destination address, source port, destination port, and protocol. The metadata server 230 uses the hash to identify the application, using a database associating hash values and application identities. The first portion of each entry in table 100 illustrates that in one embodiment, the application identity is provided as an executable file name, such as "ACRORD32.EXE."

Then in step 262, the metadata server 230 provides the metadata to the protocol parsing engine/HTTP proxy 240, the metadata now including the executable identifier. The protocol parsing engine 240 may then cache the metadata information in a cache (not shown in FIG. 2). The protocol parsing engine/HTTP proxy 240 may be implemented as separate modules or components, separating the protocol parsing engine from the HTTP proxy engine, In step 264, the host 210 begins the handshake that begins a transport control program (TCP) connection with the server 250 by sending a SYN packet. The HTTP proxy 240 receives the SYN packet and establishes an association that binds the metadata and the connection before passing the SYN packet on to server 250 in step 268. In steps 270-272, the remainder of the standard 3-way handshake is performed, with the server 250 sending a SYN+ACK packet in step 270 and the host 210 responding with an ACK packet in step 272 to complete establishing the TCP connection between host 210 and server 250.

In step 274 the host 210 sends a data packet via the connection established with the server 250, which is intercepted by the HTTP proxy and passed to the protocol parsing engine of the protocol parsing engine/HTTP proxy module 240. In step 276, the protocol parsing engine parses the payload of the data packet to obtain the user-agent data, if any, provided in the HTTP GET command contained in the data packet. The host application and the user agent are both provided for analysis in process 280, using the analysis techniques described below, to attempt to detect malware on the host 210.

In step 292, the protocol parsing engine and HTTP proxy passes the data packet on to the server 250 if security policies allow such communication. The network device 220 in one embodiment is configured as a firewall or intrusion protection system device and may be configured with security policies unrelated to the host application to user-agent mapping that may cause the network device 220 to refuse to allow the data packet send in step 274 to be relayed to the server 250. In some embodiments, the analysis process 280 may also cause a refusal to allow the data packet to be sent to the server 250. The server 250 then responds to the HTTP GET with data in step 294, which is intercepted by the protocol parsing engine/HTTP proxy 240 and relayed to the host 210 in step 296.

Figure 3:
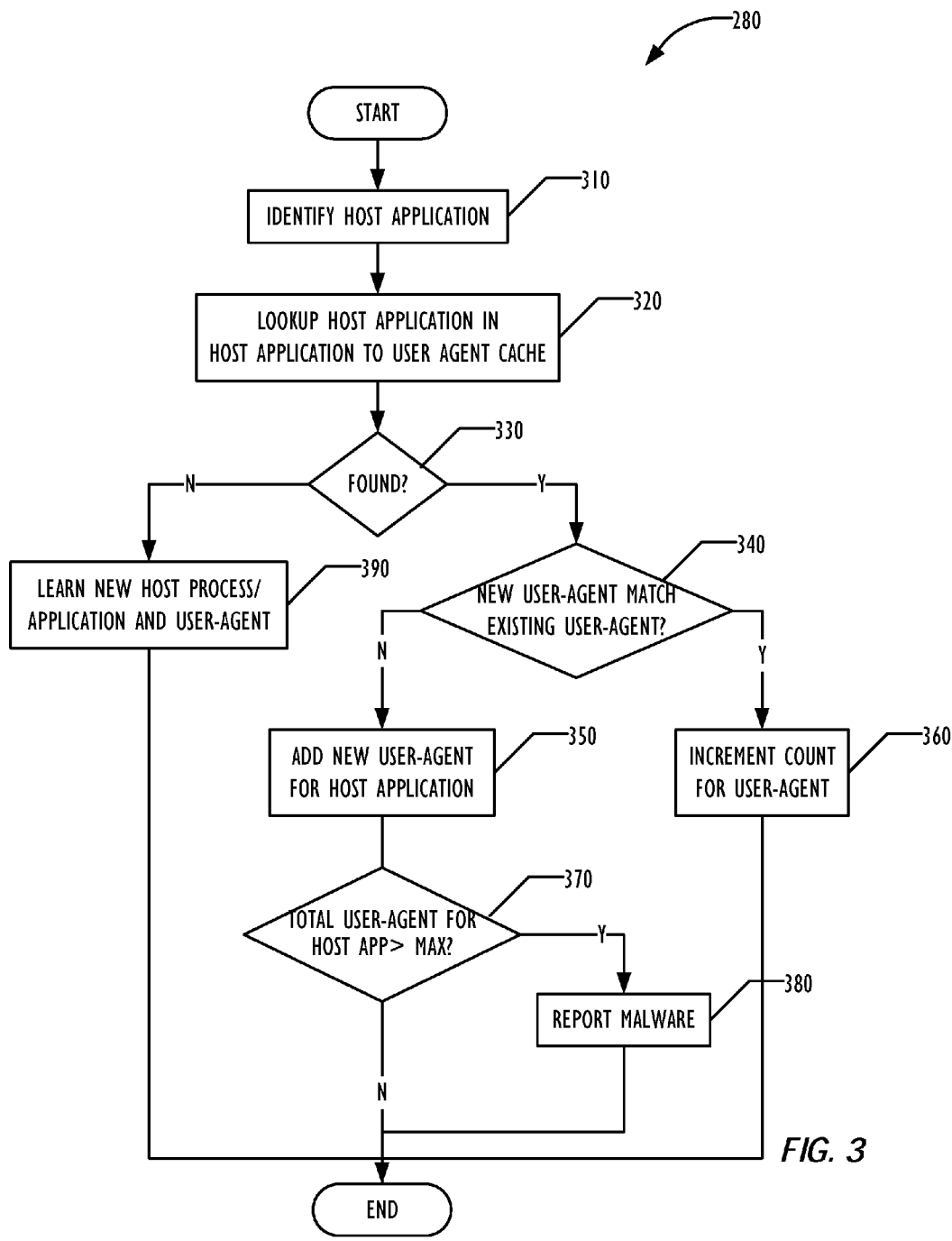
FIG. 3 is a flowchart illustrating a technique for analyzing user agents according to one embodiment.

FIG. 3 is a flowchart illustrating an embodiment of the analysis process 280 for analyzing user agent data in block 310 the host application is identified. In block 320, a lookup of the host application is performed in a host application to user agent cache. In block 330, the result of that lookup is determined. If the host application is not found in the application to user agent cache, then in block 390 the new host application is associated with the user agent and the association stored in the application to user agent cache. Although referred to as a cache in FIG. 3, any type of storage of host application and associated user agent data may be used, including any type of database, flat files, etc. that may be stored in any form of storage medium available to the network device 220. In addition to host application and user agent data, any other desired data, such as count of how many times a host application/user agent pair has been seen, may be kept in the cache.

If the host application is found in the cache, then in block 340 the user agent identified in the current data packet is compared against the user agent or agents associated with the host application in the cache. If a match is found, then in block 360 a counter may be incremented, indicating how often the network device 220 has encountered an HTTP GET with this host application user agent pair. Although not shown in FIG. 3, in some embodiments a further check may be made to determine whether the current host application and user agent are known to be malware and an action may be taken responsive to the result of such a determination.

If the user agent in the current data packet fails to match any previously associated user agent, then in block 350 a new host application to user agent association may be added to the cache. The user agent data associated with a host application may change over time as the host application is updated, such as by a new release of the software. In such a situation, the user agent data for the application typically is modified, often by retaining a first portion of the user agent data while changing a second portion, typically following the first portion in the string. In one embodiment, a partial match of the user agent information may be detected and indicated. Such a partial match of a known non-malware application to user agent mapping is generally considered a low risk of malware.

In one embodiment, a configuration option allows an administrator to set a threshold value for how many user-agents can be associated with a host application before a malware condition is determined. In some embodiments, the threshold value may be established for individual applications, allowing some applications to have different thresholds than other applications. In other embodiments, a single threshold value may be established for all applications. In yet other embodiments, a global threshold value may be established that applies as a default for all applications in the cache, but which may be overridden by a host application-specific threshold value. In block 370, a determination is made whether the number of user agents associated with the host application exceeds the threshold and if so, an indication of possible malware may be generated in block 380. The indication may be of any desired type, including a flag, a message, etc. The indication may be stored in a place that is accessible to an administrator or another program, or may be sent or reported to such an administrator or program as desired. The indication may include any desired data, including one or more of the application and user agent data from the current data packet, as well as any other information available from the cache or other data sources.

In some embodiments, the analysis process 280 may be able to cause blocking of the data packet from which the HTTP GET user agent data was extracted. In other embodiments, the analysis may simply generate an indication of possible malware in block 380, which may then be detected by an administrator or another program and used for further analysis, including triggering a scan or other analysis of the condition of the host 210 to attempt to locate and possibly remove the malware. The indication indicates that the application is suspicious and should be analyzed further.

Although the present disclosure is written in terms of HTTP GET, the same or similar techniques may be used for other protocols other than HTTP and for other commands other than HTTP GET.

Figure 4:
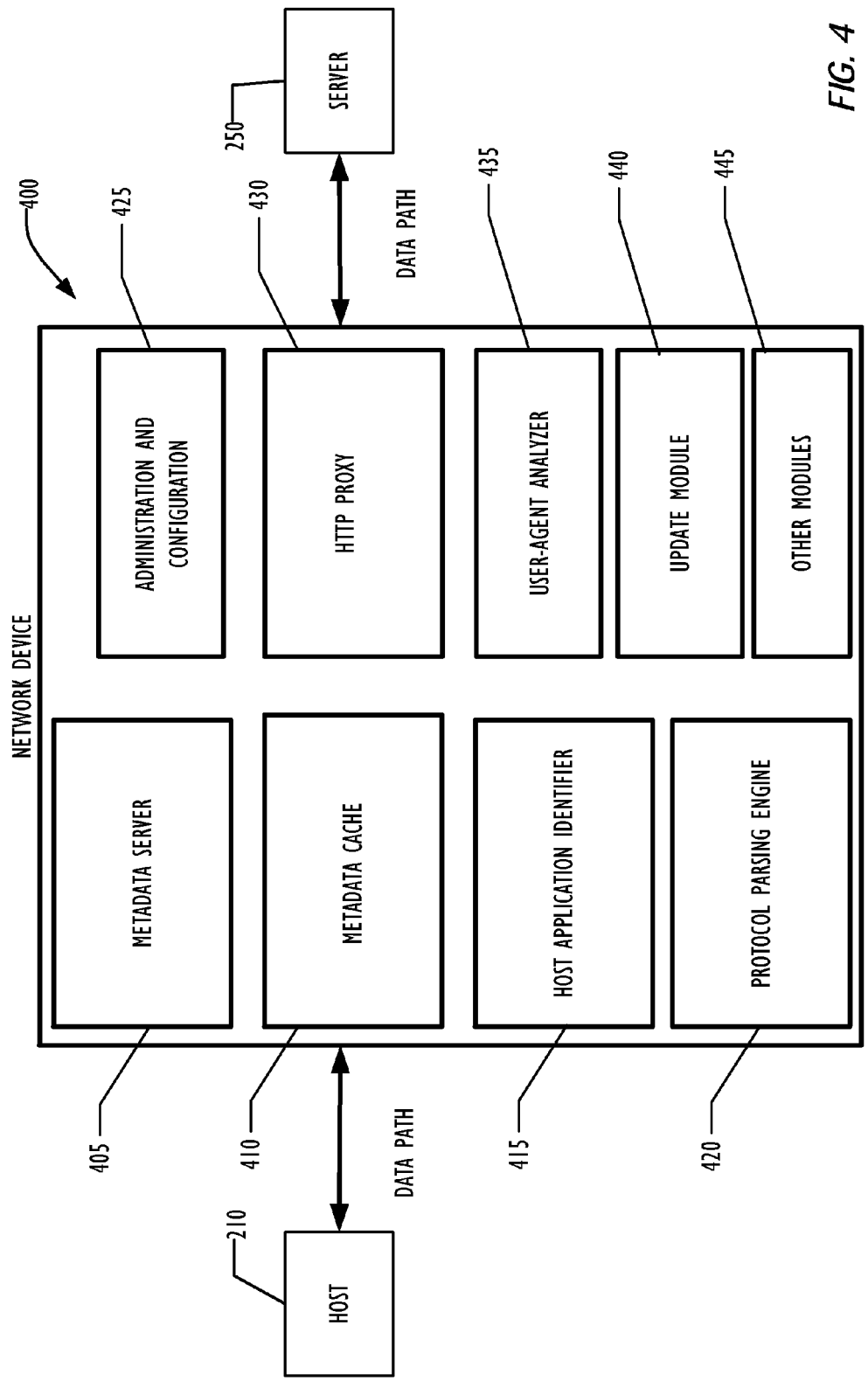
FIG. 4 is a block diagram illustrating a network device according to one embodiment.

FIG. 4 is a block diagram of the internal structure of one embodiment of a network device 400 (corresponding to the network device 210 of FIG. 2, connected between the host 210 and server 250) that can perform the techniques described above. The components or modules illustrated in FIG. 4 may be implemented in hardware, firmware, software, or any combination thereof. Other components may be included as desired, and any of the components or modules may be combined with any one or more other components or modules as desired. The arrangement of the components or modules in FIG. 4 is illustrative and by way of example, and is not intended to represent any physical arrangement. The term "component" and "module" are considered as synonymous herein.

A metadata server 405 corresponds to the metadata server 230 of FIG. 2. A metadata cache provides storage for the metadata provided to the metadata server 405, and may be implemented using any permanent or temporary storage technique, including volatile or non-volatile storage techniques. A host application identifier module 415 allows analysis of the metadata to determine the host application making the HTTP GET request. A protocol parsing engine 420 is used to parse the HTTP protocol, allowing extraction of the user agent data from the HTTP GET request. An administration and configuration module 425 allows an administrator of the network device 400 to administer the network device 400, configuring it as desired, such as by setting the user agent threshold(s) described above in the discussion of block 370. Other configuration parameters or values may be established by the module 425, including configuration options that determine what response, if any, should be made to the indication of malware that may be established in block 380.

In one embodiment, the administration and configuration module 425 may allow an administrator to pre-load the cache of host application to user agent mappings with common known mappings. Similarly, embodiments may allow an administrator to modify the cache, making desired changes to the collected data, such as adding entries for newly identified application to user agent associations or updating an entry to mark the association as indicating malware.

Figure 5:
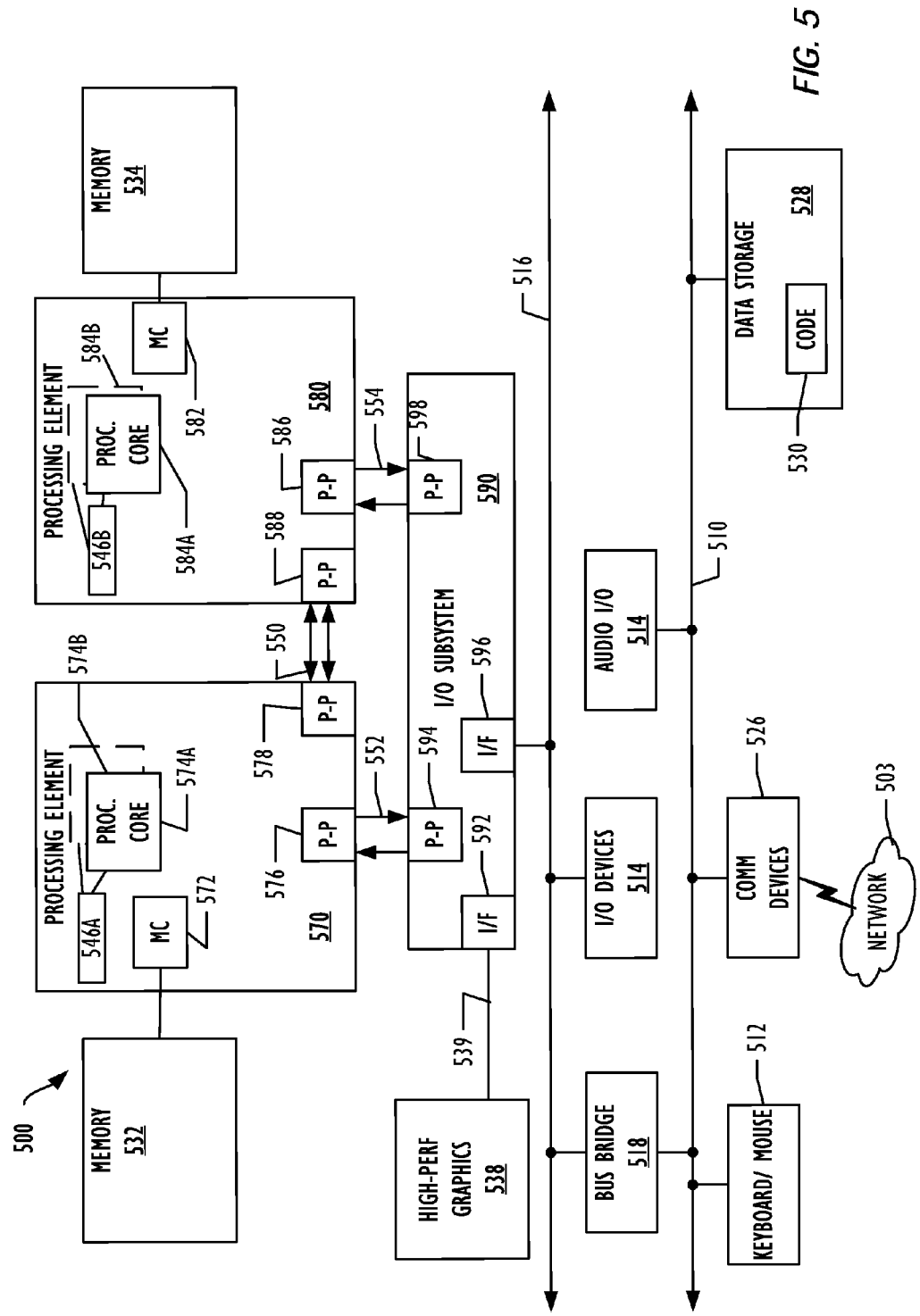
FIG. 5 is a block diagram illustrating a computing device for use with techniques described herein according to one embodiment.

Referring now to FIG. 5, a block diagram illustrates a programmable device 500 that may be used within network device 210 in accordance with one embodiment. The programmable device illustrated in FIG. 5 is a multiprocessor programmable device 500 that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-4. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between the processing elements 570, 580 in terms of a spectrum of metrics of merit including architectural, microarchitectural, thermal, power consumption characteristics, and the like. These differences may effectively manifest themselves as asymmetry and heterogeneity amongst the processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple the processing elements 570, 580 to respective memories, namely a memory 532 and a memory 534, which may be portions of main memory locally attached to the respective processors. While MC logic 572 and 582 is illustrated as integrated into the processing elements 570, 580, in some embodiments the MC logic may be discrete logic outside the processing elements 570, 580 rather than integrated therein.

Processing element 570 and processing element 580 may be coupled to an I/O subsystem 590 via P-P interconnects 576, 586 and 584, respectively. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, bus 549 may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514 may be coupled to first link 516, along with a bridge 518 which may couple first link 516 to a second link 510. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second bus 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. Also, the elements of FIG. 5 may alternatively be partitioned using more or fewer integrated chips than illustrated in FIG. 5.

Figure 6:
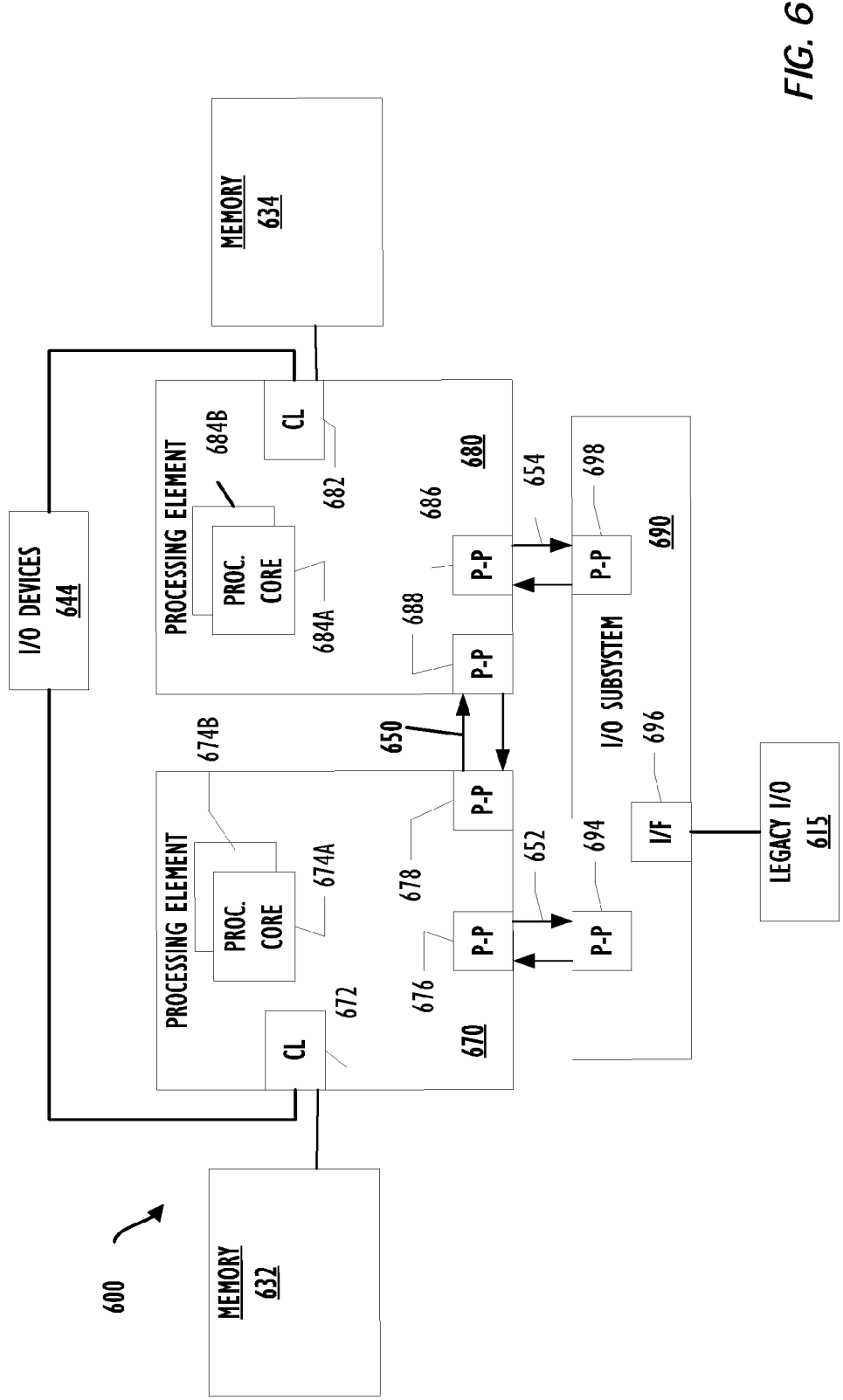
FIG. 6 is a block diagram illustrating a computing device for use with techniques described herein according to another embodiment.

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the CL 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A, and 684B. As illustrated in FIG. 6, I/O subsystem 690 includes P-P interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

An HTTP proxy 430 performs HTTP proxy functionality. HTTP proxy functionality is well known and is not described further herein. A user agent analyzer 435 performs the analysis set forth in FIG. 3 of the host application and user agent associations. An update module 440 may allow for updating software or firmware of the network device 400 for maintenance and enhancement of the network device 400. Finally, other modules 445 may be included as desired. For example, other intrusion protection functionality may be provided by such other modules 445, which may be one or more in number.

Figure 7:
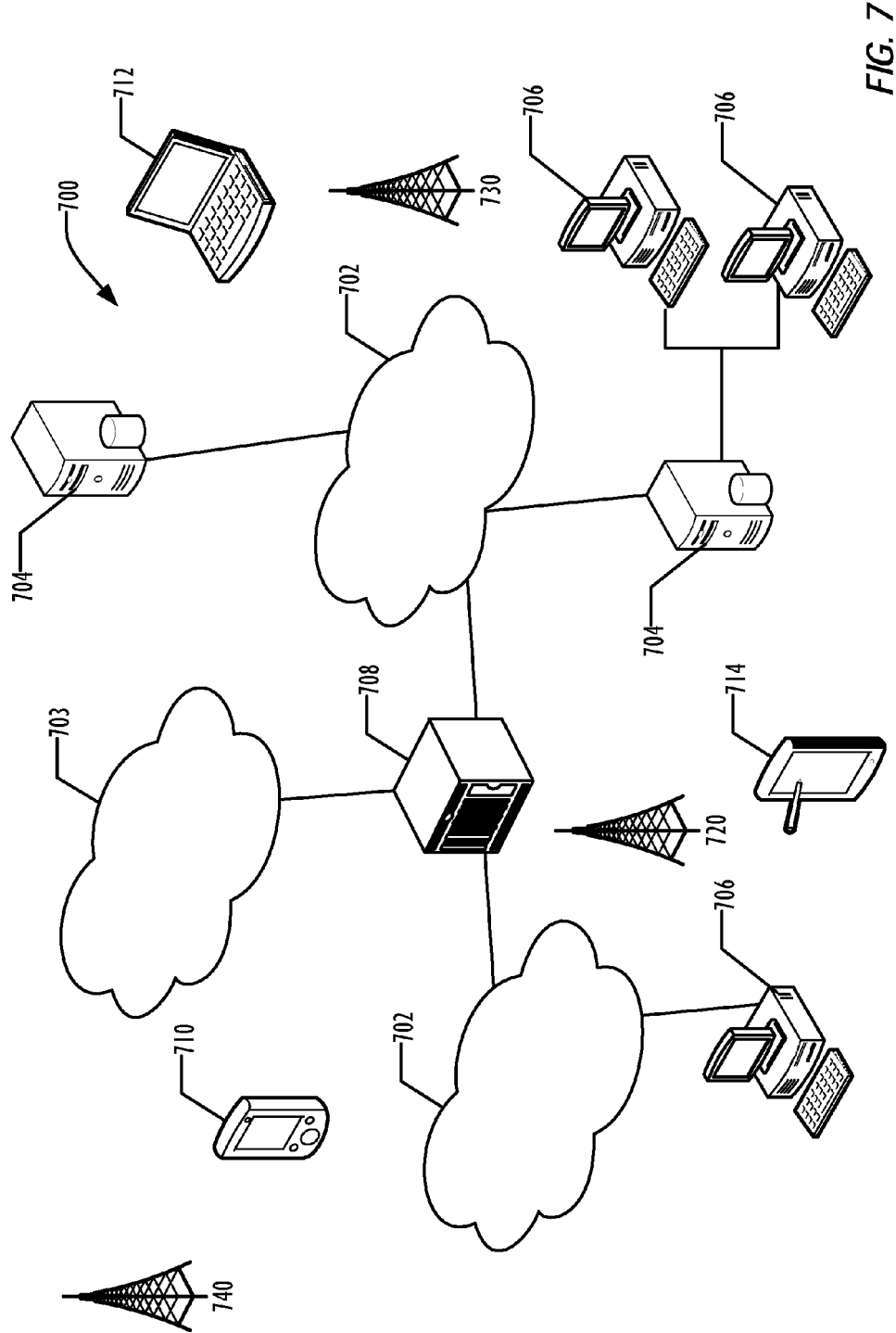
FIG. 7 is a block diagram illustrating a network of programmable devices according to one embodiment.

Referring now to FIG. 7, an example infrastructure 700 in which the techniques described above may be implemented is illustrated schematically. Infrastructure 700 contains computer networks 702. Computer networks 702 may include many different types of computer networks available today, such as the Internet, a corporate network, or a Local Area Network (LAN). Each of these networks can contain wired or wireless programmable devices and operate using any number of network protocols (e.g., TCP/IP). Networks 702 may be connected to gateways and routers (represented by 708), end user computers 706, and computer servers 704. Infrastructure 700 also includes cellular network 703 for use with mobile communication devices. Mobile cellular networks support mobile phones and many other types of devices. Mobile devices in the infrastructure 700 are illustrated as mobile phones 710, laptops 712, and tablets 714. A mobile device such as mobile phone 710 may interact with one or more mobile provider networks as the mobile device moves, typically interacting with a plurality of mobile network towers 720, 730, and 740 for connecting to the cellular network 703. Although referred to as a cellular network in FIG. 7, a mobile device may interact with towers of more than one provider network, as well as with multiple non-cellular devices such as wireless access points and routers 708. In addition, the mobile devices 710, 712, and 714 may interact with non-mobile devices such as computers 704 and 706 for desired services, which may include providing the application to user agent mapping and analysis services described above. The functionality of the network device 210 may be implemented in any device or combination of devices illustrated in FIG. 7; however, most commonly is implemented in a firewall or intrusion protection system in a gateway or router 708.

Using the techniques and apparatus described above, malware that randomizes the user agent data may be detected even though a signature-based technique would not be able to recognize a user agent as representing malware. In addition, because the user agent analysis does not depend upon a signature, zero day threats may be detected and the user agent information may be used to develop signatures for use in signature-based detection techniques.

The non-signature-based techniques described above may be implemented in combination with signature-based techniques as desired, with the signature-based techniques performed before, after, or in parallel with the non-signature-based techniques.

The following examples pertain to further embodiments.

Example 1 is a machine readable medium, on which are stored instructions, comprising instructions that when executed cause a machine to: intercept by a first device a request for data from a second device by an application, wherein the request identifies a user agent; and generate an indication responsive to a determination that a threshold number of user agents has been identified in requests from the application.

In Example 2, the subject matter of Example 1 can optionally include wherein the instructions to intercept comprise instructions that when executed cause the first device to: receive a data packet comprising the request from the second device; and relay the data packet to the second device responsive to a security policy.

In Example 3, the subject matter of Examples 1-2 can optionally include wherein the first device provides a proxy service.

In Example 4, the subject matter of Examples 1-2 can optionally include wherein the instructions that when executed causes the machine to generate an indication comprise instructions that when executed cause the machine to: identify the application requesting the data; extract a user agent data from the request identifying the user agent; and lookup the application and user agent data in a cache.

In Example 5, the subject matter of Example 4 can optionally include wherein the instructions that when executed cause the machine to generate an indication further comprise instructions that when executed cause the machine to: add an entry to the cache corresponding to the application and the user agent data responsive to a determination that no such entry exists in the cache; and determine how many entries for the application exist in the cache.

In Example 6, the subject matter of Example 4 can optionally include wherein the instructions that when executed cause the machine to generate an indication comprise instructions that when executed cause the machine to: add an entry to the cache corresponding to the application and the user agent data responsive to a determination that no entries exist in the cache for the application.

In Example 7, the subject matter of Examples 1-2 can optionally include wherein the indication indicates that the application is potentially malware.

In Example 8, the subject matter of Examples 1-2 can optionally include wherein the instructions further comprise instructions that when executed cause the machine to: update a count of requests by the application identifying the user agent.

Example 9 is a network device, comprising: means for acting as a proxy server for network traffic, intercepting a request for data from an application executing on another device; means for parsing intercepted requests and determine a user agent identified by the request; means for identifying the application making the request; and means for analyzing user agent information, comprising: means for determining how many user agents have been associated with the application; and means for indicating the application as possible malware responsive to a determination that a threshold number of user agents have been associated with the application.

In Example 10, the subject matter of Example 9 can optionally also include means for processing metadata, comprising: means for obtaining metadata from the another device corresponding to the application and the request; and means for identifying the application making the request based on the metadata.

In Example 11, the subject matter of Examples 9-10 can optionally also include: a database of application-user agent mappings.

In Example 12, the subject matter of Example 11 can optionally also include: means for allowing administrative updates to the database.

In Example 13, the subject matter of Examples 9-10 can optionally include wherein the threshold number depends upon the application.

Example 14 is a method of detecting zero day threats, comprising: receiving a data packet by a network device from an application running on a first device; identifying a user agent specified by a request for data contained in the data packet; determining a count of how many user agents have been detected associated with the application; and generating by the network device an indication that the application may be malware responsive to the count having a predetermined relationship with a predetermined threshold value.

In example 15, the subject matter of Example 14 can optionally include wherein receiving a data packet comprises: intercepting the data packet by a proxy server of the network device; and relaying the data packet to a destination specified in the data packet responsive to a security policy of the network device.

In Example 16, the subject matter of Example 14 can optionally include wherein generating by the network device an indication comprises: identifying the application from metadata received from the first device; parsing the data packet and extracting a user agent data identifying the user agent; and looking up the application and user agent in a cache of applications and associated user agents.

In Example 17, the subject matter of Example 16 can optionally include wherein generating by the network device an indication further comprises: adding an entry to the cache associating the application and the user agent responsive to a determination that no such entry exists in the cache.

In Example 18, the subject matter of Example 16 can optionally include wherein generating generating by the network device an indication further comprises: incrementing a count of requests for data by the application that specify the user agent.

Example 19 is a network device, comprising: one or more processors; a database, coupled to the one or more processors, storing associations between applications and user agents; and a memory coupled to the one or more processors, on which are stored instructions, comprising instructions that when executed cause one or more of the processors to: intercept by a proxy service of the network device a request for data from a first device; identify an application on the first device that transmitted the request for data; identify a user agent specified by the request; add an association between the application and the user agent responsive to a determination that no such association exists in the database; determine whether the application has been associated with a threshold number of user agents; and indicate that the application is suspicious responsive to the determination.

In Example 20, the subject matter of Example 19 can optionally include wherein the instructions further comprise instructions that when executed cause one or more of the processors to: relay the request for data to a destination indicated by the request.

In Example 21, the subject matter of Example 19 can optionally include wherein the database comprises a cache.

In Example 22, the subject matter of Example 19 can optionally include wherein the instructions further comprise instructions that when executed cause one or more processors to update a count of how many requests have been made by the application specifying the user agent.

Example 23 is a network device, configured to: intercept a request for data from a second device by an application, wherein the request identifies a user agent; and generate an indication responsive to a determination that a threshold number of user agents has been identified in requests from the application.

In Example 24, the subject matter of Example 23 can optionally include wherein network device is configured to intercept the request by being configured to: receive a data packet comprising the request from the second device; and relay the data packet to the second device responsive to a security policy.

In Example 25, the subject matter of Examples 23-24 can optionally include wherein the network device provides a proxy service.

In Example 26, the subject matter of Examples 23-24 can optionally include wherein the network device is configured to generate an indication by being configured to: identify the application requesting the data; extract a user agent data from the request identifying the user agent; and lookup the application and user agent data in a cache.

In Example 27, the subject matter of Example 26 can optionally include wherein the network device is configured to generate an indication by being configured to: add an entry to the cache corresponding to the application and the user agent data responsive to a determination that no such entry exists in the cache; and determine how many entries for the application exist in the cache.

In Example 28, the subject matter of Example 26 can optionally include wherein the network device is configured to generate an indication by being configured to: add an entry to the cache corresponding to the application and the user agent data responsive to a determination that no entries exist in the cache for the application.

In Example 29, the subject matter of Examples 23-24 can optionally include wherein the indication indicates that the application is potentially malware.

In Example 30, the subject matter of Examples 23-24 can optionally include wherein network device is further configured to: update a count of requests by the application identifying the user agent.

Example 31 is a machine readable medium, on which are stored instructions, comprising instructions that when executed cause a machine to: intercept by a first device a request for data from a second device by an application, wherein the request identifies a user agent; and generate an indication that the application is potentially malware responsive to a determination that a threshold number of user agents has been identified in requests from the application, wherein the first device provides a proxy service.

In Example 32, the subject matter of Example 31 can optionally include wherein the instructions to intercept comprise instructions that when executed cause the first device to: receive a data packet comprising the request from the second device; and relay the data packet to the second device responsive to a security policy.

In Example 33, the subject matter of Examples 31-32 can optionally include wherein the instructions that when executed causes the machine to generate an indication comprise instructions that when executed cause the machine to: identify the application requesting the data; extract a user agent data from the request identifying the user agent; and lookup the application and user agent data in a cache.

In Example 34, the subject matter of Example 33 can optionally include wherein the instructions that when executed cause the machine to generate an indication further comprise instructions that when executed cause the machine to: add an entry to the cache corresponding to the application and the user agent data responsive to a determination that no such entry exists in the cache; and determine how many entries for the application exist in the cache.

In Example 35, the subject matter of Examples 33-34 can optionally include wherein the instructions that when executed cause the machine to generate an indication comprise instructions that when executed cause the machine to: add an entry to the cache corresponding to the application and the user agent data responsive to a determination that no entries exist in the cache for the application.

In Example 36, the subject matter of any of Examples 31-35 can optionally include wherein the instructions further comprise instructions that when executed cause the machine to: update a count of requests by the application identifying the user agent.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium, on which are stored instructions, comprising instructions that when executed cause a machine to:
   intercept by a first device a request for data from a second device by an application, wherein the request identifies a user agent; and
   generate an indication responsive to a determination that a predetermined threshold number of different user agents has been identified in requests from the application,
   wherein the predetermined threshold number is application-specific.

2. The machine readable medium of claim 1, wherein the instructions to intercept comprise instructions that when executed cause the first device to:
   receive a data packet comprising the request from the second device; and
   relay the data packet to the second device responsive to a security policy.

3. The machine readable medium of claim 1, wherein the first device provides a proxy service.

4. The machine readable medium of claim 1, wherein the instructions that when executed causes the machine to generate an indication comprise instructions that when executed cause the machine to:
   identify the application requesting the data;

extract a user agent data from the request identifying the user agent; and lookup the application and user agent data in a cache.

5. The machine readable medium of claim 4, wherein the instructions that when executed cause the machine to generate an indication further comprise instructions that when executed cause the machine to:

add an entry to the cache corresponding to the application and the user agent data responsive to a determination that no such entry exists in the cache; and determine how many entries for the application exist in the cache.

6. The machine readable medium of claim 4, wherein the instructions that when executed cause the machine to generate an indication comprise instructions that when executed cause the machine to:

add an entry to the cache corresponding to the application and the user agent data responsive to a determination that no entries exist in the cache for the application.

7. The machine readable medium of claim 1, wherein the indication indicates that the application is potentially malware.

8. The machine readable medium of claim 1, wherein the instructions further comprise instructions that when executed cause the machine to:

update a count of requests by the application identifying the user agent.

9. A network device, comprising:

a proxy component, configured to act as a proxy server for network traffic, intercepting a request for data from an application executing on another device;

a protocol parsing engine, configured to parse intercepted requests and determine a user agent identified by the request;

a host application identifier component, configured to identify the application making the request; and a user agent analyzer component, configured to determine how many different_user agents have been associated with the application; and indicate the application as possible malware responsive to a determination that a predetermined threshold number of different_user agents have been associated with the application, wherein the predetermined threshold number is application-specific.

10. The network device of claim 9, further comprising:

a metadata server component, configured to obtain metadata from the another device corresponding to the application and the request; and identify the application making the request based on the metadata.

11. The network device of claim 9, further comprising:

a database of application-user agent mappings.

12. The network device of claim 11, further comprising: an administration and configuration component, configured to allow administrative updates to the database.

13. The network device of claim 9, wherein the threshold number depends upon the application.

14. A method of detecting zero day threats, comprising:

receiving a data packet by a network device from an application running on a first device;

identifying a user agent specified by a request for data contained in the data packet;

determining a count of how many different user agents have been detected associated with the application; and generating by the network device an indication that the application may be malware responsive to the count having a predetermined relationship with a predetermined threshold value, wherein the predetermined threshold value is application-specific.

15. The method of claim 14, wherein receiving a data packet comprises:

intercepting the data packet by a proxy server of the network device; and relaying the data packet to a destination specified in the data packet responsive to a security policy of the network device.

16. The method of claim 14, wherein generating by the network device an indication comprises:

identifying the application from metadata received from the first device;

parsing the data packet and extracting a user agent data identifying the user agent; and looking up the application and user agent in a cache of applications and associated user agents.

17. The method of claim 16, wherein generating by the network device an indication further comprises:

adding an entry to the cache associating the application and the user agent responsive to a determination that no such entry exists in the cache.

18. The method of claim 16, wherein generating by the network device an indication further comprises:

incrementing a count of requests for data by the application that specify the user agent.

19. A network device, comprising:

one or more processors;

a database, coupled to the one or more processors, storing associations between applications and user agents; and a memory coupled to the one or more processors, on which are stored instructions, comprising instructions that when executed cause one or more of the processors to:

intercept by a proxy service of the network device a request for data from a first device;

identify an application on the first device that transmitted the request for data;

identify a user agent specified by the request;

add an association between the application and the user agent responsive to a determination that no such association exists in the database;

determine whether the application has been associated with a predetermined threshold number of different user agents; and indicate that the application is suspicious responsive to the determination, wherein the predetermined threshold number is application-specific.

20. The network device of claim 19, wherein the instructions further comprise instructions that when executed cause one or more of the processors to:

relay the request for data to a destination indicated by the request.

21. The network device of claim 19, wherein the database comprises a cache.

22. The network device of claim 19, wherein the instructions further comprise instructions that when executed cause one or more processors to update a count of how many requests have been made by the application specifying the user agent.

* * * * *